United States Patent [19]

Von Hayn et al.

[11] Patent Number: 5,141,298
[45] Date of Patent: Aug. 25, 1992

[54] HYDRAULIC UNIT FOR A BRAKING PRESSURE REGULATING DEVICE

[75] Inventors: Holger Von Hayn, Bad Vilbel; Erhard Beck, Darmstadt, both of Fed. Rep. of Germany

[73] Assignee: Alfred Teves GmbH, Frankfurt am Main, Fed. Rep. of Germany

[21] Appl. No.: 647,180

[22] Filed: Jan. 24, 1991

Related U.S. Application Data

[63] Continuation of Ser. No. 494,893, Mar. 12, 1990, abandoned, which is a continuation of Ser. No. 337,039, Apr. 12, 1989, abandoned.

[30] Foreign Application Priority Data

May 17, 1988 [DE] Fed. Rep. of Germany ....... 3816748

[51] Int. Cl.⁵ .................................. B60T 13/14
[52] U.S. Cl. ............................. 303/1195 V; 137/859
[58] Field of Search ......... 303/113 R, 116 R, 1195 V, 303/119 R, 84.1, 84.2, DIG. 6; 137/852, 859, 860

[56] References Cited

U.S. PATENT DOCUMENTS

| 259,682 | 6/1882 | Gruber | 137/859 X |
|---|---|---|---|
| 1,350,610 | 8/1920 | Henig | 137/859 X |
| 2,615,675 | 10/1952 | Mellart | 137/859 X |
| 3,194,262 | 7/1965 | Hamilton et al. | 137/852 X |
| 3,646,957 | 3/1972 | Allen | 137/860 |
| 4,141,379 | 2/1979 | Manske | 137/859 |
| 4,175,794 | 11/1979 | Pauwels | 303/119 |
| 4,210,370 | 7/1980 | Mortimer | 303/119 |
| 4,690,465 | 9/1987 | Takeda et al. | 303/119 |
| 4,705,324 | 11/1987 | Kervagoret | 303/119 |
| 4,765,693 | 8/1988 | Stegmaier | 137/596.17 X |
| 4,813,448 | 3/1989 | Leiber | 303/115 |

FOREIGN PATENT DOCUMENTS

| 1200084 | 3/1966 | Fed. Rep. of Germany . | |
|---|---|---|---|
| 1266084 | 4/1968 | Fed. Rep. of Germany . | |
| 2120076 | 12/1973 | Fed. Rep. of Germany . | |
| 2504972 | 8/1976 | Fed. Rep. of Germany | 303/119 |
| 2556023 | 6/1977 | Fed. Rep. of Germany | 303/119 |
| 7244153 | 7/1977 | Fed. Rep. of Germany . | |
| 2610579 | 9/1977 | Fed. Rep. of Germany . | |
| 2714160 | 10/1977 | Fed. Rep. of Germany . | |
| 2940182 | 4/1980 | Fed. Rep. of Germany . | |
| 3133283 | 3/1983 | Fed. Rep. of Germany . | |
| 3236535 | 4/1984 | Fed. Rep. of Germany . | |
| 3342128 | 5/1984 | Fed. Rep. of Germany . | |
| 3435950 | 4/1986 | Fed. Rep. of Germany . | |
| 3607693 | 9/1987 | Fed. Rep. of Germany | 303/119 |
| 422407 | 1/1935 | United Kingdom | 137/859 |
| 1117185 | 6/1968 | United Kingdom . | |

Primary Examiner—Matthew C. Graham
Attorney, Agent, or Firm—Robert P. Seitter; J. Gordon Lewis

[57] ABSTRACT

A hydraulic unit for a hydraulic controlling or regulating device, in particular for a braking pressure regulating device in anti-lock control systems or traction slip control systems for automotive vehicles The hydraulic unit comprises a valve-accommodating member (13) accommodating electromagnetically switchable valves. Hydraulic channels (23) are contained in the valve-accommodating member. Incorporated in the side wall of the valve-accommodating member (13) is a non-return valve which is composed of a resilient element (28) that is clamped into the side wall (33) of a depression of the outside wall of the valve-accommodating member (13). The resilient element (28) is made of spring steel and is furnished with sealing material (34). The present hydraulic unit provides significant size reduction of the valve-accommodating member (13) in that the hydraulic components such as the non-return valves which are normally disposed in the interior of the valve-accommodating member (13) are placed into the outside wall of the valve-accommodating member (13).

9 Claims, 3 Drawing Sheets

HYDRAULIC UNIT FOR A BRAKING PRESSURE REGULATING DEVICE

This application is a continuation of application Ser. No. 494,893, filed Mar. 12, 1990 now abandoned, which is a continuation of 337,039 filed Apr. 12, 1989 also abandoned.

BACKGROUND OF THE INVENTION

The present invention relates to a hydraulic unit for a hydraulic controlling or regulating device for use as a braking pressure regulating device in anti-lock control systems or traction slip control systems for use on automotive vehicles. The hydraulic unit includes a valve-accommodating member accommodating at least one electromagnetically switchable valve and further including hydraulic components such as non-return valve, a throttle, etc.

German published patent application 2504972 discloses an electromagnet having a current-operated coil and a stationary, magnetizable core, and further including a non-magnetic guide tube for an armature movable under magnet force and a device for preventing the armature from becoming magnetically stuck on the stationary core. The armature is furnished with a flange outside of the guide tube in a known manner. The distance between the flange surface facing the guide tube and the end surface of the guide tube adjacent to the flange is smaller than the possible stroke of the armature in the direction of the stationary magnet core, the stroke being a predetermined distance.

Furthermore, another controlling or regulating system is known from German published patent application 3236535. This controlling or regulating system comprises at least one generator (control command generator and/or measured-value generator), an electronic evaluating circuit for the generator signals and at least one solenoid valve. The valve is driven by the electronic evaluating circuit and is inserted in a hydraulic or pneumatic actuating system. The evaluating circuit is arranged in the vicinity of the valve.

In this system the evaluating circuit and the electromagnet(s) of the solenoid valves are accommodated in one common housing and are interconnected. The valve parts of the at least one solenoid valve are incorporated in one separate block, and the common housing is attached to this block. At least one valve is actuatable by way of the at least one tappet which extends out of the common housing and which is displaceable by the electromagnet.

German patent application P 3729216 describes a hydraulic unit for a hydraulic controlling or regulating device, more particularly for a braking pressure regulating device in anti-lock control systems or traction slip control systems for automotive vehicles. At least one valve block is provided comprising a group of electromagnetically switchable valves, and a connector for further components of the controlling or regulating device.

The pressure fluid inlets and outlets of the electromagnetically switchable valves which are to be connected in terms of circuitry with pressure fluid inlets and outlets of the further components of the controlling or regulating device are placed in the area of an outside surface of the valve block. The pressure fluid inlets and outlet of the controlling or regulating device are arranged in the area of an outside surface of the connector of the controlling or regulating device. There is provision of at least one distributor element containing pressure fluid channels which inter-connect inlets and outlets of the valve block allocated in terms of circuitry, on the one hand, and inlets and outlets of the further components of the controlling or regulating device, on the other hand.

It is an object of the present invention that considerable weight reduction of the entire hydraulic unit is to be accomplished. The steel valve blocks used are to be significantly reduced. In steel valve blocks as they are described for instance in German patent application P 37 29 216.1 a diminution of the blocks becomes possible to such extent that only so much material remains as is necessary for jamming the valve assemblies in the valve-accommodating member. The non-return valves incorporated in the valve block, for instance, are an obstacle when attempting a reduction or diminution of the valve blocks. It is one of the objects of this invention to eliminate this drawback. Further, standardization of all non-return valve bores is to be accomplished. For the non-return valve function itself, only very small space requirement should be necessary. The manufacture and assembly of the non-return valves is to be rendered less expensive.

Moreover, it is an object of the present invention to enable a simple inspection of single hydraulic components separately and from the outside. This applies especially for the inspection of the non-return valves. Such inspection is to be possible from the outside merely by observation. One of the objects of the present invention is to provided for permitting use of a new type of non-return valve which is simple and inexpensive, which is made of a sheet-metal part and which does not necessitate careful machining of the surfaces of those component parts which are essential for their functioning.

Furthermore, the invention provides that the areas of accommodation for the non-return valves can be machined from the outside and that the non-return valves themselves can be mounted on the valve block from the outside. This results in a considerable cost reduction of the manufacture and assembly of the hydraulic unit and renders the entire hydraulic unit more appropriate for automated and mechanical manufacture and assembly.

SUMMARY OF THE INVENTION

The above-mentioned objects are achieved by the present invention in that at least one hydraulic component is arranged in the outside wall of the valve-accommodating member. A particularly simple embodiment of the present invention is that a non-return valve is disposed in a depression of the outside wall of the valve-accommodating member and comprises a resilient element which is secured in the side wall of the depression, and wherein the resilient element is preferably composed of biassed spring steel. Moreover, it can be provided that the hydraulic component which performs the valve function is disposed in the outside wall of the valve-accommodating member, with an area of the outside wall being designed as a valve seat participating in the valve function.

An inexpensive but effective embodiment provides that the resilient element can assume a first position and a second position wherein the flow cross-section of the hydraulic component is opened in the first position, while it is closed in the second position. To facilitate mass production, the resilient element can be designed as a sheet-metal stamping, wherein the resilient element substantially has the shape of a flower with radially arranged petals, whose outward range is clamped in the valve-accommodating member and whose inward range is axially movable and, furnished with sealing material, forms a valve surface. For the sealing portion of the surface of the resilient element the sealing material can be vulcanized thereto, buttoned thereto, or applied by way of screen process printing.

A particularly cost-efficient embodiment which can be made by pressworking, stamping and spinning in large quantities provides that the resilient element is designed as a plate whose outer edge is fastened in the valve-accommodating member, in this embodiment the plate comprises in its inner area recesses, in particular of arcuate configuration, which impart to the plate's middle movability in axial direction, that the plate is coupled to a metal carrier plate, in particular by being buttoned thereto, with the metal carrier plate carrying the sealing material.

BRIEF DESCRIPTION OF THE DRAWING

Further details of this invention are setforth in the following detailed description of several embodiments of the invention taken in conjunction with the accompanying drawing wherein.

DETAILED DESCRIPTION

Figure 1:
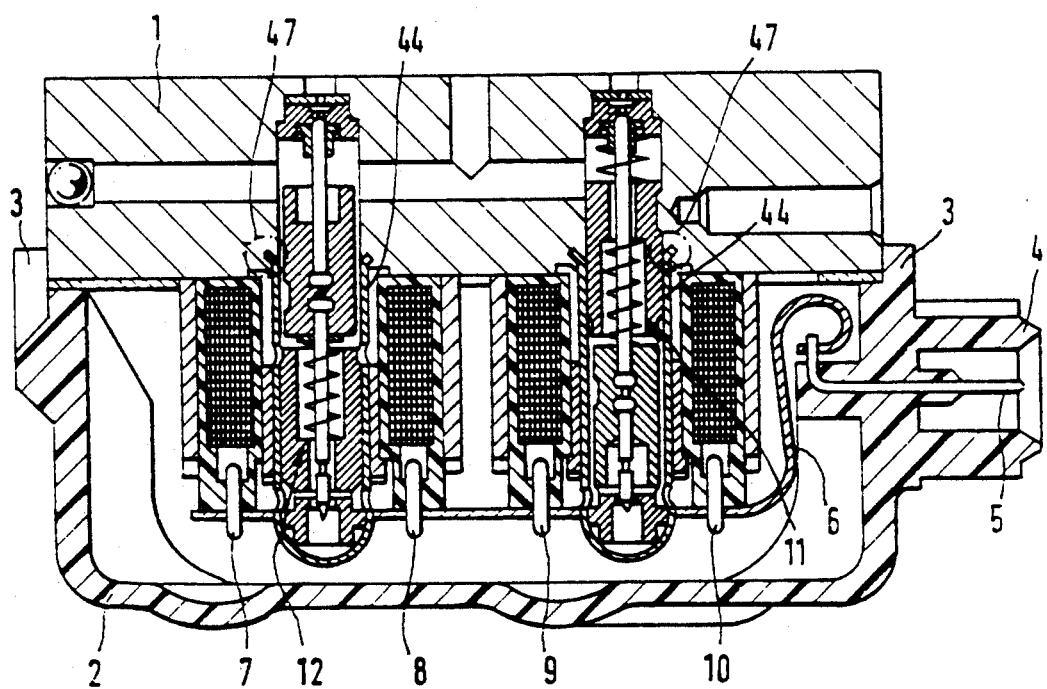
FIG. 1 shows a valve block, composed of a valve-accommodating member, solenoid valves and a cover.

FIG. 1 is an illustration of a known valve block unit which is to be improved by the instant invention. The valve block unit according to FIG. 1 consists of a valve-accommodating member 1 and a cover 2. The cover 2 is furnished with a circumferential edge 3 and a cover attachment 4 with a contact blade 5. Reference numeral 6 designates a contacting foil interconnecting the contact pins 7, 8, 9 and 10 and the contact blade. The contacting foil contains corresponding electrical lines. Numeral 11 refers to a solenoid valve which is opened in its de-energized state. Numeral 12 designates a solenoid valve which is closed in its de-energized state. Incorporated in this known valve-accommodating member are a plurality of hydraulic components, more particularly non-return valves. These components make it impossible to diminish the dimensions of the valve-accommodating member to the extent that only so much material is left over as is required for caulking the sleeves 44 in the area 47.

The present invention provides for an extensive reduction diminution of the valve-accommodating member. This is achieved in that for instance the position of the non-return valves is shifted from the interior of the valve-accommodating member into the outer boundary of the valve-accommodating member.

Figure 2:
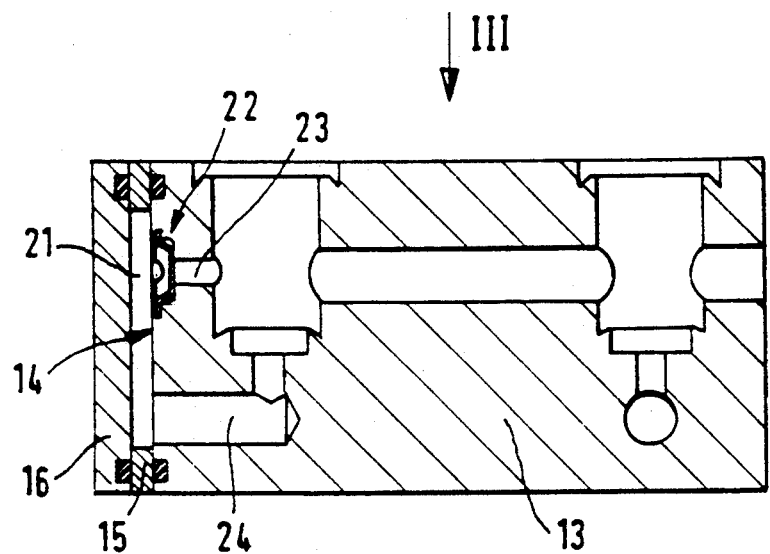
FIG. 2 shows in a schematic view the position of a non-return valve on the valve block.
Figure 3:
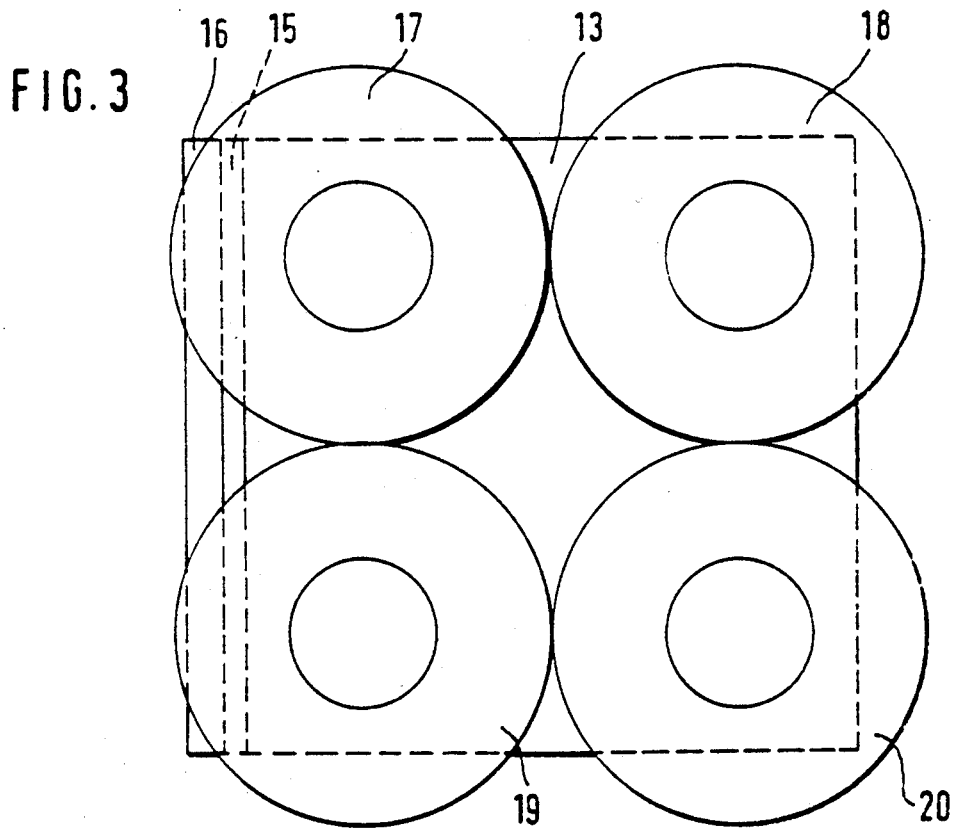
FIG. 3 shows a view of the subject matter of FIG. 2 in the direction of the arrow III of FIG. 2.

In FIG. 2, the valve-accommodating member is referred to by numeral 13. Disposed on its left-hand boundary 14 is a hydraulic circuit board 15 which comprises hydraulic channels, for example, in the form of oblong apertures 21. Hydraulic circuit board 15 is closed by a cover 16. FIG. 3 is a view of FIG. 2 in the direction of the arrow III. The valve coils which are referred to by reference numerals 17, 18, 19, 20 in FIG. 3, have been omitted in FIG. 2 for the sake of simplicity. The hydraulic circuit board and the cover in FIG. 3 carry the same reference numerals as in FIG. 2.

It is apparent from a comparison of FIGS. 1 and 3 that the valve-accommodating member 13 in FIG. 3 is considerably decreased in size compared to the valve-accommodating member 1 of FIG. 1. The coils 17, 18, 19, 20 extend like collars over the valve-accommodating member 13 of FIG. 3. In the area of the outside wall of the valve-accommodating member 13 of FIG. 2 a non-return valve is placed which, in its entirety, is designated by 22. In the presence of pressure in the channel 23 which is in excess of the pressure in the oblong aperture 21, the non-return valve 22 will open, and pressure fluid flows into the oblong aperture 21 of the channel circuit board 15. From there, pressure fluid can propagate into the channel 24.

Figure 4:
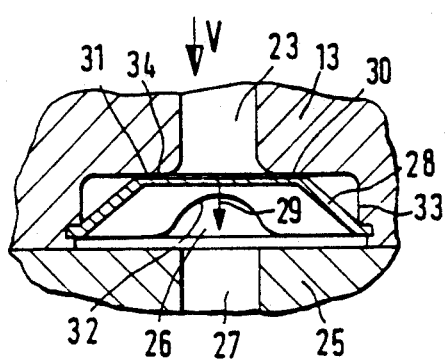
FIG. 4 is an enlarged scale view of the non-return valve according to FIG. 2.

FIG. 4 shows in a radially taken cross-sectional view the non-return valve according to FIG. 2. For better recognition of the individual parts, a larger scale has been provided in FIG. 4. Reference numeral 13 designates the valve-accommodating member. Numeral 25 is a connector, for example of a hydraulic circuit board. When the pressure prevailing in channel 23 is higher than that prevailing in chamber 26 and channel 27, the sheet-metal part 28 made of spring steel will be deformed in the direction of the arrow 29. The valve surface 30 of the sheet-metal part or resilient element 28 lifts from the valve seat 31 which is part of the valve-accommodating member 13. Pressure fluid can flow from the channel 23 through the recesses 32 in the resilient element 28 into the chamber 26 and into the channel 27. The resilient element 28 is clamped into the side wall 33 of a depression in the wall of the valve-accommodating member. The securing-in-position can be effected by caulking, for example. While the resilient element is made of spring steel, sealing material 34 can be vulcanized in the area of the sealing surface.

Figure 5:
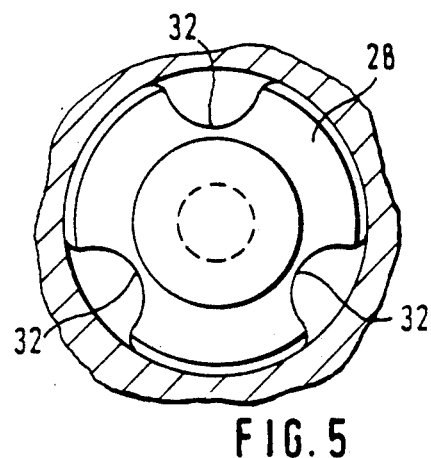
FIG. 5 shows a view in the direction of the arrow V of FIG. 4.

It can be seen from FIG. 5 that the resilient element 28 has the shape of a flower with radially arranged petals, whose outward rims are fastened in the valve-accommodating member 13, see FIG. 4.

The resilient element 28 can assume two positions. In the first position that is illustrated, the flow cross-section is closed, while the cross-section is opened in a second non-illustrated position in which the resilient element in FIG. 4 is pressed down-wardly. Instead of sealing material being vulcanized, there may also be provision of a buttoned seal or a seal which is applied by way of screen process printing.

Figure 6:
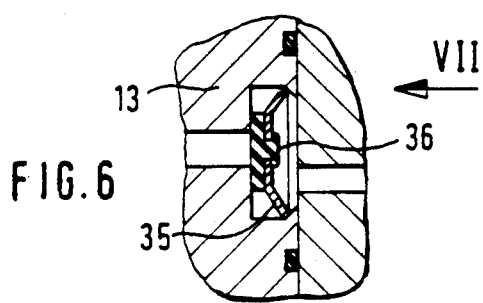
FIG. 6 shows another embodiment of the present invention.
Figure 7:
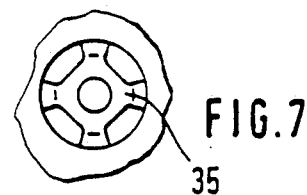
FIG. 7 shows a view in the direction of the arrow VII of FIG. 6.

FIGS. 6 and 7 illustrates another embodiment of the present invention. A resilient element 35 is clamped in a depression of the wall of the valve-accommodating member 13 and is provided with a buttoned seal 36. A top view of the contours of the resilient element provided in from FIG. 7.

Figure 8:
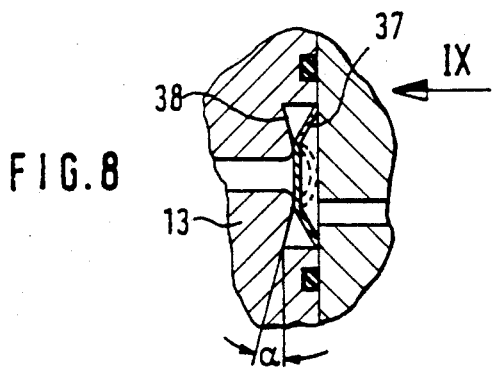
FIG. 8 shows another embodiment of the present invention.
Figure 9:
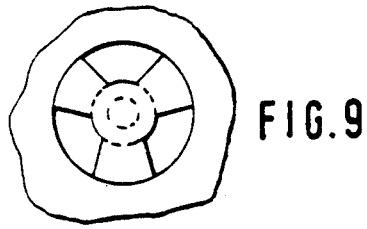
FIG. 9 shows a view in the direction of the arrow IX of FIG. 8.

FIGS. 8 and 9 illustrate another embodiment of the present invention. It can be gathered from FIG. 8 that the resilient element 37 which is arranged in a depression of the valve-accommodating member 13 abuts on a bottom 38 of the depression, the bottom of which is chamfered. The chamfer is characterized by the drawn angle alpha. A definite annular sealing surface results from this chamfer. The external contour of the resilient element 37 is illustrated in the top view according to FIG. 9. In the embodiment according to FIGS. 8 and 9 sealing material also can be applied in the area of the sealing surface by vulcanization, etc., and described above.

The embodiments according to FIGS. 6 to 9 permit interconnection by valve hydraulic channels of a non-return valve which are not arranged coaxially. As will be apparent from FIGS. 6 and 8, the opposed channels are located in an offset manner relative to each other.

Figure 10:
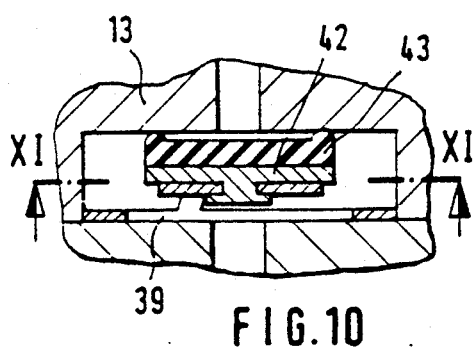
FIG. 10 shows still another embodiment of the present invention.
Figure 11:
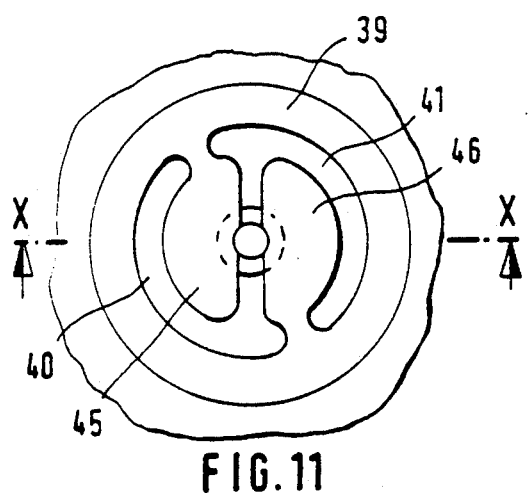
FIG. 11 shows a cross-sectional view taken along the line of cross-section XI—XI of FIG. 10.

In the embodiment according to FIGS. 10 and 11, the resilient element 39 comprises a spring washer which, by way of its rim, is fixed to the lateral surfaces of a depression in the outside wall of the valve-accommodating member.

FIG. 10 shows the resilient element 39 in a cross-section taken along the line of intersection X—X of FIG. 11. FIG. 11 shows the resilient element according to the line of intersection XI—XI of FIG. 10. The spring washer is furnished with axial resiliency or movability. This movability is achieved by arcuate recesses 40, 41 within the spring washer. Buttoned into the middle of the spring washer is a metal carrier plate 42. For this purpose, the arms 45, 46 are adapted to be elastically bent upwards. The metal carrier plate is provided with sealing material 43.

According to the present invention, it is possible to easily check the outwardly disposed hydraulic components such as the non-return valves. Moreover, checking the outwardly disposed components likewise indicates functioning of the inwardly disposed components, for example the solenoid valves, more particularly the valves which are opened in their de-energized state and those which are closed in their de-energized state. For example, the quantity of fluid leakage of the valves provides observational information as to proper or poor functioning.

What is claimed is:

1. A hydraulic unit for a hydraulic controlling device, including a braking pressure regulating device in a slip control system for use on automotive vehicles, said unit comprising, in combination: a valve-accommodating member accommodating at least one electromagnetically switchable valve and further comprising hydraulic components including at least one non-return valve wherein at least one hydraulic component of said hydraulic components includes a resilient member and is arranged in a depression in an external side wall of the valve-accommodating member and including pressure fluid channels connected to said switchable valve and which channels extend in such external side wall and wherein said pressure fluid channels are formed and enclosed by said external side wall and a hydraulic circuit board having oblong apertures therein with the external side of said apertures being closed by a cover fastened to at least one of said hydraulic circuit board and said valve-accommodating member.

2. A hydraulic unit as claimed in claim 1, wherein said non-return valve is disposed in said depression of the external side wall of the valve-accomodating member which comprises said resilient member secured in the depression, wherein the resilient member is composed of biased spring steel.

3. A hydraulic unit as claimed in claim 1, wherein an area of the external side wall functions as a valve seat.

4. A hydraulic unit as claimed in claim 3, wherein the resilient member is displaceable between a first position and a second position in response to hydraulic fluid pressure thereacross, the flow cross-section of the hydraulic component being opened in the first position, and closed in the second position.

5. A hydraulic unit as claimed in claim 4, wherein the resilient member is in the shape of a flower with radially arranged petals, whose outward range is clamped in the valve-accommodating member and whose inward range is axially movable, and is furnished with sealing material which forms a valve surface.

6. A hydraulic unit as claimed in claim 4, wherein the sealing material is vulcanized onto the resilient member.

7. A hydraulic unit as claimed in claim 4, wherein the sealing material is buttoned onto the resilient member.

8. A hydraulic unit as claimed in claim 4, wherein the sealing material is applied by way of screen process printing.

9. A hydraulic unit as claimed in claim 1, wherein said resilient member is arranged as a plate whose outer edge is fastened in the valve-accomodating member, wherein the plate comprises in its inner area recesses of arcuate configuration, which impart moveability of the middle of the plate in axial direction, and wherein the plate is coupled to a metal carrier plate by being buttoned thereinto, and said metal carrier plate carrying a sealing material member.

* * * * *